J. REECE.
STOPPING AND STARTING MECHANISM.
APPLICATION FILED FEB. 24, 1917.
1,281,657.
Patented Oct. 15, 1918.
2 SHEETS—SHEET 1.
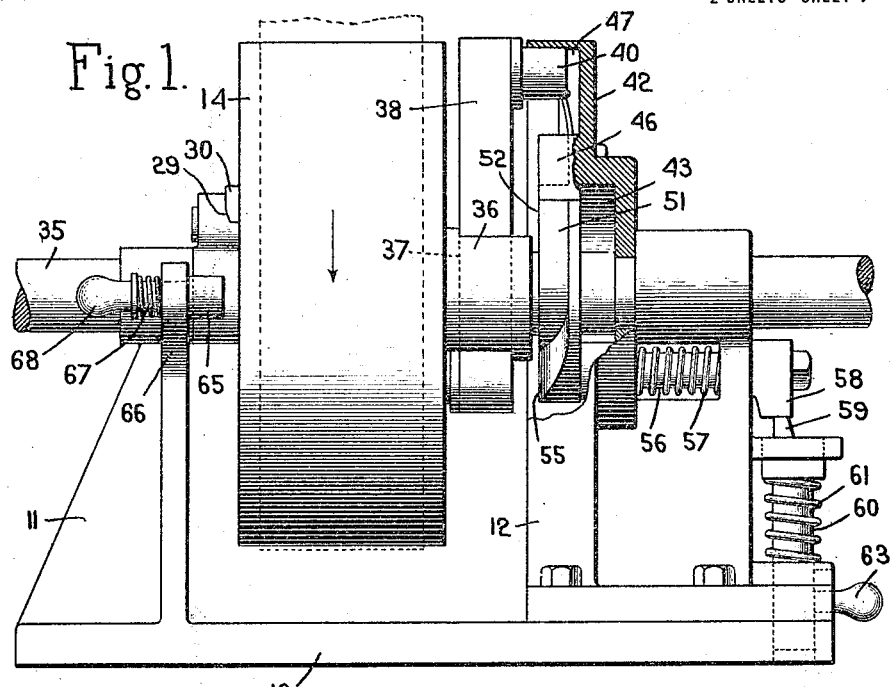
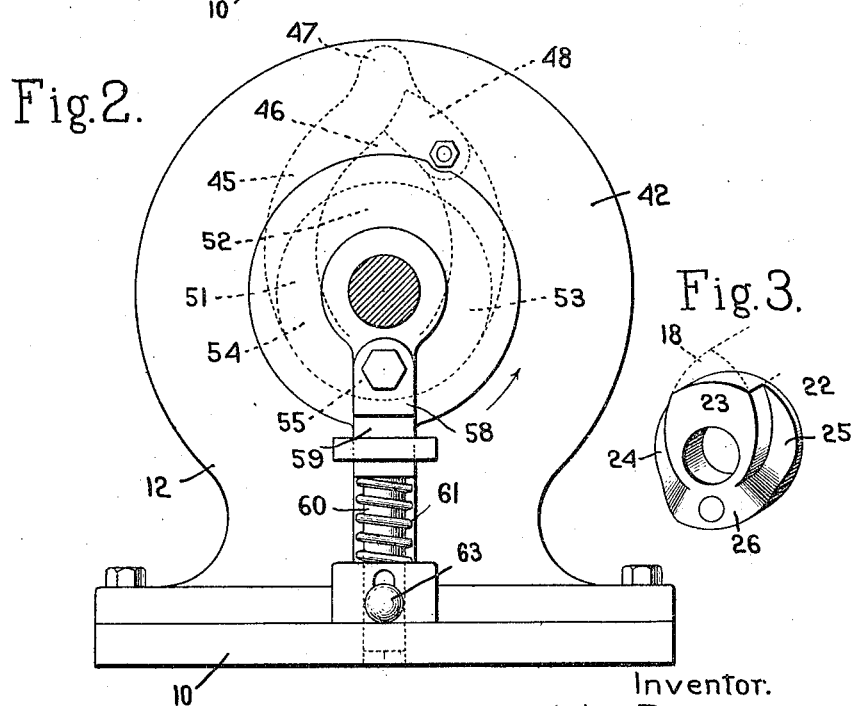
Inventor.
John Reece
by
Rogers, Kennedy & Campbell, Attys.

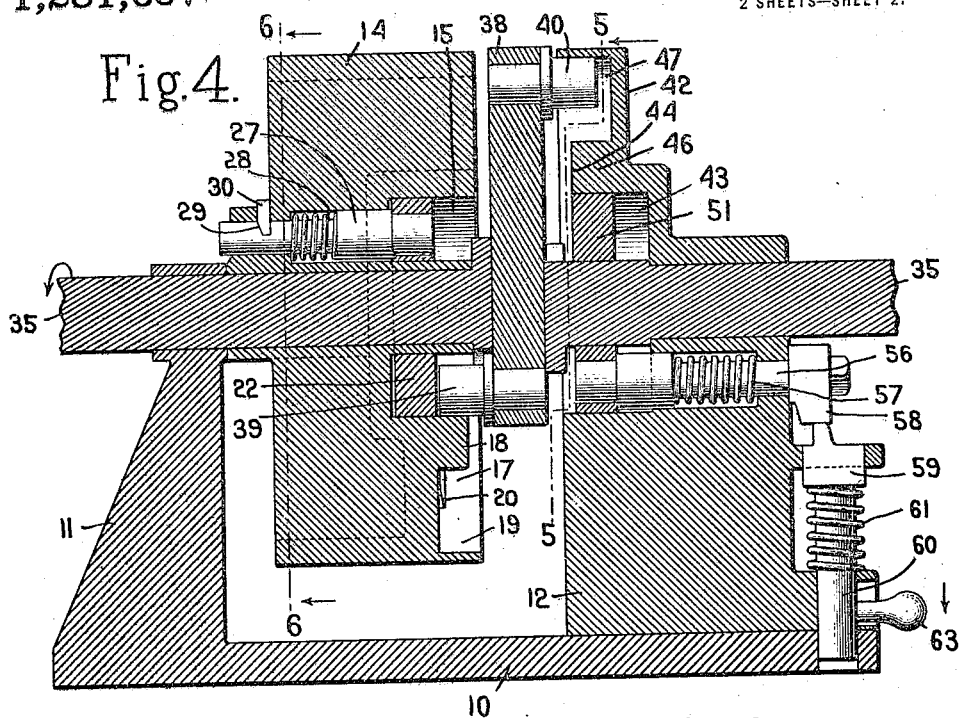

UNITED STATES PATENT OFFICE.

JOHN REECE, OF MANCHESTER, MASSACHUSETTS, ASSIGNOR TO THE REECE BUTTON HOLE MACHINE COMPANY, OF BOSTON, MASSACHUSETTS, A CORPORATION OF MAINE.

STOPPING AND STARTING MECHANISM.

1,281,657.               Specification of Letters Patent.       Patented Oct. 15, 1918.

Application filed February 24, 1917. Serial No. 150,677.

*To all whom it may concern:*

Be it known that I, JOHN REECE, a citizen of the United States, residing at Manchester, in the county of Essex and State of Massachusetts, have invented certain new and useful Improvements in Stopping and Starting Mechanism, of which the following is a specification, reference being had therein to the accompanying drawing.

This invention relates to stopping or starting mechanisms for various machines such, for example, as power driven sewing machines. The principal object of the invention is to afford a mechanism whereby the machine shaft, which is usually termed the driven shaft, may at suitable time be brought from its condition of working speed rotation through intermediate speeds to a stopped condition quickly and so as to give a definite final or stopped position, and yet without abrupt action or shock. A further object is to provide such a mechanism wherein the restarting of the machine is likewise effected easily, that is, without abruptness or shock, by a gradual speed change from zero to the working speed. Other objects and advantages of this invention will be set forth in the hereinafter following description or will be apparent to those skilled in the art.

To the attainment of such objects and advantages the present invention consists in the novel mechanism, and the novel combinations, arrangements, constructions and details herein shown or described.

Generally speaking, this invention presupposes a continuously moving driving member, which will usually be a belt driven shaft, and the present invention includes in combination with its stationary member, and of course the driven member or shaft adapted to be rotated and stopped, together with a means for transmitting a rotating or stopping force to the driven shaft, this transmitting means being relatively shiftable in such way as to progressively change the operative relation between the driven member and the driving and stationary members, so as to cause a progressive speed decrease or increase between the working speed and zero.

I wish to make it clear that in many respects the mechanism to be herein described is reversible. For example, if the driving member be rendered stationary, the mechanism will still operate by permitting certain stationary parts to rotate; and various mechanisms or features pertaining to one or the other of the three members, driving, driven and stationary, may be relatively interchanged as between them without departing from the principles involved.

In the accompanying drawings forming a part hereof; Figure 1 is a side elevation of a stopping or starting mechanism embodying the present invention, the illustrated mechanism being shown, for convenience, merely as one of the many possible embodiments for the invention. In this and the other figures the parts are shown in the position they occupy when the driven shaft has been stopped. Fig. 2 is a right elevation of the parts shown in Fig. 1. Fig. 3 is a perspective of a certain shiftable cam part.

Fig. 4 is a vertical central longitudinal section of the mechanism shown in Figs. 1 and 2. Fig. 5 is a right elevation partly in section on the plane 5—5 of Fig. 4. Fig. 6 is a right elevation partly in section on the plane 6—6 of Fig. 4.

A frame or base 10 is shown which is provided with brackets or supports 11 and 12 which afford bearings for the various elements of the system. The support 11 is shown as affording a bearing for the left end of the driven member or shaft while the support 12 affords a bearing for the other end of the driven member and carries certain non-rotating parts.

Referring now to the driving or continuously rotating parts of the system, these commence with the belt pulley 14 which is shown of hollow construction and formed with spokes between its hub and rim. The hub of the driving pulley or fly wheel 14 is sleeved upon or loosely surrounds the driven shaft 35, which will be later described. The pulley 14 with its hub may be considered the main driving member of the system. I may mention that when the driving and driven members are interchanged a driving pulley might be provided on the latter.

The main driving member or pulley 14 is shown as provided in its right face with a concentric circular recess 15. The pulley casting is formed with a wall 16 which in part surrounds the recess 15 but, as seen in Fig. 5, is extended at the opposite side to form the outer surface of a cam or groove 17 which, in a general way, is the shape of a lemon. Adjacent the recess 15 the cam groove is bounded interiorly by an extension or island 18. The cam groove 17 at its two sides meets at the apex or extremity 19 of the cam and within one of the side portions of the groove is located a spring or switch 20 so that the follower, later to be described, will be compelled always to travel in a given direction around the cam when leaving the apex 19.

The lemon shaped cam 17 is bounded not only by the parts mentioned, but by shiftable part 22 of general circular form with the cam contour as best shown in the perspective Fig. 3. This shiftable cam part 22 is adapted to fit within the recess 15 of the main driving member and to be slid axially thereon from an operative to an inoperative position. Thus, Fig. 4 shows the cam part 22 shifted into inoperative position away from the cam follower.

Referring to Fig. 3 the shiftable cam part is formed at its right hand face with an elevation or flat surface 23 and at each side thereof grooved portions 24 and 25, the former of which is tapered toward and the latter of which is tapered from an apex 26.

It will be understood that the shiftable cam part 22 is carried by and rotates with the main driving member. It surrounds the hub of the latter and is engaged by a pin 27 which compels it to rotate, the pin at the same time serving as the means for shifting the cam part 22 to and from operative position. The pin 27 is provided with a spring 28 tending to throw it to the right and thereby carry the shiftable cam part into operative position. The pin is also provided with a notch 29 by which it is adapted to be latched in its inoperative position, as seen in Fig. 4, by means of a latch 30 which is carried around with and pivoted to the pulley as seen in Fig. 6, the latch having a tail 31 by which it may be released and a spring 32 holding it in latched position. This completes the enumeration of the continuously rotating driving parts.

Coming now to the driven parts of the apparatus, these comprise a main driven member or shaft 35 suitably journaled in the brackets 11, 12. The driven member is formed into an enlargement 36 near the driving members and through this enlargement is cut a square slideway 37. Through the slideway is loosely movable a carrier 38 which is provided at one end with a follower or stud 39 adapted to coöperate with the cam groove 17, before mentioned, when the driven shaft is being started or driven, and at its other end with a similar follower or stud 40 adapted to coöperate with another cam groove 45, hereinafter to be described, in the process of stoppage. The fittings of the carrier 38 are such as to permit the two followers to move radially in unison, whereas the carrier and followers are prevented from moving axially; the consequence being that when the cam part 22 is shifted axially it may be brought into or out of coöperative relation with its follower.

When the driven shaft is stopped the follower 40 is in its radial outward position, as seen in Fig. 4, while the follower 39 is near to the driven shaft and inoperative; and these positions will be reversed when the driven shaft is being actuated. Since the carrier 38 and the two studs thereon are the only described means for transmitting a starting, driving, slowing or stopping force to the driven shaft, the carrier, with either or both studs, may be referred to as a transmitter. Before describing the complete operation it may be mentioned that the driven shaft is driven at full speed when the follower 39 occupies the terminal recess or apex 19 of the cam groove 17 in the main driving member. The remaining portions of the cam groove 17 serve the function of progressively accelerating or retarding the driven shaft when the conditions are being reversed. I have now completed an enumeration of all of the rotating parts of the illustrated apparatus. It will be noticed that the transmitting means is included among the parts which rotate and stop with the driven shaft.

The process of starting consists in bringing the driven shaft into the same condition of motion as the driving member and analogously the stopping process may be considered as bringing the driven shaft into the same condition of zero rotation as the stationary parts of the machine, which latter will now be described.

The bracket 12 has an upward extension 42, the left face of which is formed analogously to the right face of the main driving member. Thus we have the circular recess 43 similar to the recess 15; also the wall 44 similar to the wall 16; also the groove 45 similar to the groove 17; also the island 46 similar to the island 18; also the apex 47 similar to the apex 19; and the spring or switch 48 similar to the spring 20. These various parts are seen best in Figs. 1 and 4 and many of them are indicated in dotted lines in Fig. 2.

The circular recess 43 is occupied by a shiftable cam part 51 similar to the shiftable cam part 22 beforementioned; and the cam part 51 similarly has an elevation 52, side groove portions 53 and 54, and apex 55.

Similarly also the axial shifting of the non-rotating cam part 51 is effected by a sliding pin 56 acted on by spring 57 tending to move the cam part into operative position. The exterior or right end of the pin 56 is formed with a lug 58 adapted to be held in retracted position by a spring-lifted latch 59 mounted on shank 60 surrounded by spring 61. I have now completed an enumeration of non-rotating or stationary parts of the apparatus with the exception of the control parts which will now be referred to.

For simplicity I show control performed manually or at will, that is to say the stoppage or the restarting of the driven shaft is initiated by the hand control device, about to be described, although the stopping or starting process, itself, is carried out purely automatically when once initiated. In other words, the driven shaft may be kept in operation or may be kept idle as long as the operator desires and he then operates the control device to set into action the automatic means for changing the condition from rotating to stationary or vice versa.

For causing the automatic stopping connections to operate, I may provide a simple handle or knob 63 on the shank 60 which guides the latch 59. By depressing the handle the latch is withdrawn from the hook or lug 58 so that the spring 57 is enabled to throw the shifting cam part 51 into its operative position, seen in Figs. 1 and 4, which action is followed by the automatic and shockless slowing and stoppage of the driven shaft quickly and yet so as to give a predetermined final position.

Analogously a restarting device is provided for the purpose of permitting the rotating cam part 52 to shift from left to right to cause the driven shaft to accelerate and be driven at the full speed. This control may be effected through the tail 31 of the latch 30, already mentioned. Stud 65, see Figs. 1 and 6, stands normally out of the path of the latch tail 31, being mounted on a bracket 66 and acted upon by spring 67 which forces the stud 65 leftward, as seen in Fig. 1, a knob or handle 68 being provided whereby the stud may be thrust toward the right so as to coact with the latch tail 31.

The parts having now been described, the complete operation may be set forth. Since the parts are shown in their stopped position I will first describe the operation in restarting the machine. By pushing the restarting handle 68 to the right the stud 65 is brought into the path of the tail 31 so that the pin 27 is unlatched and the spring 28 shifts the circular cam part 22 from its inoperative position, seen in Fig. 4, toward the right. The result of this will be to cause the cam groove 17 to engage the stud 39 of the transmitter, the stud being in the position shown adjacent the shaft, Figs. 1 and 5, and at this time not rotating. Fig. 5 shows in face view the relative position of the parts, the circumferential arrow showing the direction of rotation of the driving member. The engagement of the stud and groove may be delayed slightly if the elevation 23 of the cam part should first come in contact with the stud; but eventually the groove will engage the follower. The engagement becomes effective as the stud passes relatively from the cam part 26, see Fig. 3, into the cam groove portion 24, which grows deeper until the stud is fully engaged in the groove before occupying the cam groove part 17. The continued rotation carries the stud relatively beyond the spring switch 20 and finally into the apex 19 of the cam groove, at which point the stud serves to effectively lock together the driving and the driven parts so that the latter will rotate at full speed.

During this operation the transmitter 38 slides radially through the driven shaft, and, as the follower 39 moves radially outward, the follower 40 will move radially inward. During such shifting each follower is engaging in its cam and the interaction of the two cams on the two followers causes, during the shifting, a progressive acceleration of the driven shaft until, as stated, the operation terminates by the follower 39 entering the apex 19 of the driven member cam. The action of the follower 40 during this shifting is that it leaves the apex 47 of the stationary cam and passes along the grooves 45 and 54 until reaching the lifted apex 55. The outwardly curved portion of the cam 54 serves to cam back or throw to the right the circular cam part 51 against the resistance of the spring 57 until, at the time the driven shaft is running at full speed, the cam part 51 has become latched at its right hand or inoperative position. In fact the latching faces of the lug 58 and the latch 59 are such as to cam the member 51 slightly further to the right so that there will be no contact with the follower 40. Thus the stopping cam is rendered totally inoperative, and the follower 40 is enabled to rotate idly in the concentric recess 43.

The stopping process is substantially the reverse of the starting process and will be initiated by depressing the handle 63. The circular cam part 51 jumps to the left and the stud 40, after it has effectively engaged the stopping cam, is thrown progressively outwardly along the cam grooves 53 and 45 to the apex or locking point 47 of the stopping cam, this action being accompanied by the inward shifting of the other follower 39, from the apex 19 of the driving cam along the groove 17 and the groove 25, until the shiftable cam part is cammed back by its own elevation 26 to the point where the latch 30 becomes effective to lock it in its inoperative position. During the stopping the driven shaft is being driven but at progressively decreasing speed and simultaneously retarded, to the point of final stoppage. The shaft is thus invariably brought to the desired final position in a brief space of time without material shock, all under the automatic control of the adjustable transmitting mechanism and the cams coöperating therewith.

It will thus be seen that I have described a stopping or starting mechanism embodying the principles and attaining the objects and advantages hereinbefore recited. Many matters of arrangement, combination, detail and other features may be varied without departing from the main principles involved, and it is therefore not intended to limit the invention to such features except in so far as specified in the appended claims.

What is claimed is:

1. In a stopping or starting mechanism, the combination of a continuously rotating driving member, a stationary member, a driven member adapted to be rotated and stopped, and a transmitting means relatively shiftable to progressively change the operative relation between the driven member and the other members to cause a progressive speed change between working speed and zero, said transmitting means during its shifting having operative engagement with all three of said members.

2. In a stopping or starting mechanism, the combination of a continuously rotating driving member, a stationary member, a driven member adapted to be rotated and stopped, and a transmitting means relatively shiftable to progressively change the operative relation between the driven member and the other members to cause a progressive speed change between working speed and zero, said transmitting means during its shifting having operative engagement with all three of said members, but becoming inoperative with relation to one or the other of the driving or stationary members at the finish of its shifting movement.

3. In a stopping or starting mechanism. the combination of a continuously rotating driving member, a stationary member, a driven member adapted to be rotated and stopped, and a transmitting means rotatable with the driven member and radially relatively shiftable to progressively change the operative relation between the driven member and the other members to cause a progressive speed change between working speed and zero.

4. In a stopping or starting mechanism, the combination of a continuously rotating driving member, a stationary member, a driven member adapted to be rotated and stopped, a transmitting means relatively shiftable to progressively change the operative relation between the driven member and both the other members to cause positive drive at a progressively changing speed between working speed and zero, and means for locking the driven member to the driving or stationary members in the extreme positions of the transmitter.

5. In a stopping mechanism, the combination of a continuously rotating driving member, a stationary member, a driven member adapted to be rotated and stopped, and a transmitting means relatively shiftable while engaging both the driving and stationary member to progressively change the operative relation between the driven member and the other members and thereby to cause positive drive at a progresively reducing speed from working speed to zero.

6. In a stopping mechanism, the combination of a continuously rotating driving member, a stationary member, a driven member adapted to be rotated and stopped, a transmitting means relatively shiftable while engaging both the driving and stationary members to progressively change the operative relation between the driven member and the other members and thereby to cause positive drive at a progressively reducing speed from working speed to zero, and means for holding the driven member in a predetermined stopped position at the termination of the action of said transmitting means.

7. In a stopping or starting mechanism, the combination of a continuously rotating driving member, a stationary member, a driven member adapted to be rotated and stopped, a transmitting means relatively shiftable while engaging both the driving and stationary members to progressively change the operative relation between the driven member and the other members and thereby to cause positive drive at a progressively reducing speed between working speed and zero, and means for locking the driven member to the driving or stationary members in the extreme positions of the transmitter and for operatively disengaging it from the member other than that to which it is locked.

8. In a stopping or starting mechanism the combination of a continuously rotating driving member having a cam at its face, a stationary member having a cam facing the cam in said driving member, a driven member carrying a radially shiftable transmitting means adapted to operatively engage and disengage said cams respectively, and control means for rendering one or the other of said cams operative at will to cause the stopping or restarting of the driven member.

9. In a stopping or starting mechanism the combination of a continuously rotating driving member having a cam at its face, a stationary member having a cam facing the cam in said driving member, a driven member carrying a radially shiftable transmitting means adapted to operatively engage and disengage said cams respectively, and control means for rendering one or the other of said cams operative at will to cause the stopping or restarting of the driven member; such control means arranged and connected to bring about the axial shifting of an operative part of each cam into operative relation with a follower connected to the transmitting means.

10. In combination, a stationary machine member, a rotatable driving member, a driven member adapted to be rotated and stopped while the driving member continues rotating, a shiftable transmitter connected with the driven member, a device between the driving member and transmitter through which the driving member may at times drive at full speed, and a device between the stationary member and transmitter through which the driven member may at times be held against drive, said two devices being arranged to both engage the transmitter as it shifts, whereby the driven member is positively driven at progressively changing speed during starting or stopping of the machine.

11. In combination, a stationary machine member, a rotatable driving member, a driven member adapted to be rotated and stopped while the driving member continues rotating, and a shiftable transmitter connected to rotate and stop with the driven member, a cam device on the driving member operatively engaging the transmitter for full speed drive, a cam device on the stationary member operatively engaging the transmitter for preventing drive, and said cams arranged to both engage the transmitter as it shifts whereby the driven member is positively driven at progressively changing speed during stopping or starting.

12. In combination, a rotatable driving member carrying a cam, a driven member adapted to be rotated and stopped while the driving member continues rotating, a non-rotating cam, and a shiftable transmitter so coördinated with the two cams and driven member that as the transmitter shifts the driven member is positively driven at a progressively changing rate.

13. In combination, a rotatable driving member, a driven member adapted to be rotated and stopped while the driving member continues rotating, a transmitter connected to rotate and stop with the driven member, a device on the driving member coöperating with the transmitter, and a non-rotating device coöperating with the transmitter, the parts so correlated that the driven member is positively driven at a progressively changing rate between full speed and zero when stopping or starting.

In testimony whereof, I have affixed my signature hereto.

JOHN REECE.

Copies of this patent may be obtained for five cents each, by addressing the "Commissioner of Patents, Washington, D. C."